US010767465B1

(12) United States Patent
Bartel

(10) Patent No.: US 10,767,465 B1
(45) Date of Patent: Sep. 8, 2020

(54) SIMULATING CURRENT FLOW THROUGH A WELL CASING AND AN INDUCED FRACTURE

(71) Applicant: National Technology & Engineering Solutions of Sandia, LLC, Albuquerque, NM (US)

(72) Inventor: Lewis C. Bartel, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 365 days.

(21) Appl. No.: 15/412,374

(22) Filed: Jan. 23, 2017

Related U.S. Application Data

(63) Continuation of application No. 13/206,041, filed on Aug. 9, 2011, now abandoned.

(51) Int. Cl.
*E21B 47/022* (2012.01)
*E21B 17/00* (2006.01)
*E21B 41/00* (2006.01)
*G01V 99/00* (2009.01)
*G01V 3/20* (2006.01)
(Continued)

(52) U.S. Cl.
CPC ...... *E21B 47/02224* (2013.01); *E21B 17/003* (2013.01); *E21B 41/0092* (2013.01); *G01V 3/20* (2013.01); *G01V 99/005* (2013.01); *G06F 17/11* (2013.01); *G06F 30/30* (2020.01); *E21B 43/26* (2013.01); *G06F 2111/10* (2020.01)

(58) Field of Classification Search
CPC ... E21B 47/02224; E21B 17/003; G01V 3/20; G06F 17/5045; G06F 17/11
USPC .......................................................... 703/2
See application file for complete search history.

(56) References Cited

U.S. PATENT DOCUMENTS

| | | | | |
|---|---|---|---|---|
| 3,879,097 | A | * | 4/1975 | Oertle .................. E21B 17/028 340/855.1 |
| 4,901,069 | A | * | 2/1990 | Veneruso ............... E21B 17/003 166/66 |

(Continued)

OTHER PUBLICATIONS

Patzek et al. (Lossy transmission line model of hydrofractured well dynamics, 2000, Elsevier Science B.V., pp. 59-77) (Year: 2000).*
(Continued)

*Primary Examiner* — Iftekhar A Khan
(74) *Attorney, Agent, or Firm* — Daniel J. Jenkins

(57) ABSTRACT

A system includes a receiver component that receives a model of a well system, the model comprising a representation of an electrically energized well casing and/or a fracture as a transmission line that leaks electric current as the current traverses the well casing and/or fracture. The receiver component also receives a value that indicates an amount of the current that is applied to the well casing and a location of a source of the current on the well casing. The system further includes an electromagnetic field calculator component that calculates an estimated electromagnetic field at at least one location on the surface of the earth based at least in part upon the representation of the electrically energized well casing and/or fracture, the value that indicates the amount of current that is applied to the well casing, and the location of the source of the current on the well casing.

13 Claims, 7 Drawing Sheets

(51) Int. Cl.
*G06F 17/11* (2006.01)
*G06F 30/30* (2020.01)
*E21B 43/26* (2006.01)
*G06F 111/10* (2020.01)

(56) References Cited

U.S. PATENT DOCUMENTS

| | | | | |
|---|---|---|---|---|
| 5,018,589 | A | 5/1991 | Williams | |
| 5,170,378 | A * | 12/1992 | Mellor | E21B 43/26 181/105 |
| 5,230,387 | A * | 7/1993 | Waters | E21B 7/068 175/45 |
| 6,330,914 | B1 * | 12/2001 | Hocking | C09K 8/80 166/250.1 |
| 6,597,178 | B1 * | 7/2003 | Nichols | G01V 3/28 324/339 |
| 6,725,930 | B2 * | 4/2004 | Boney | C09K 8/80 166/280.2 |
| 7,073,581 | B2 * | 7/2006 | Nguyen | C09K 8/805 166/250.12 |
| 7,082,993 | B2 | 8/2006 | Ayoub et al. | |
| 7,424,911 | B2 * | 9/2008 | McCarthy | C09K 8/805 166/250.12 |
| 7,726,397 | B2 * | 6/2010 | McDaniel | C09K 8/805 166/250.1 |
| 7,819,181 | B2 * | 10/2010 | Entov | G01V 3/26 166/250.01 |
| 8,253,417 | B2 * | 8/2012 | Pislak | G01V 3/22 166/250.1 |
| 8,633,700 | B1 * | 1/2014 | England | G01V 3/12 324/348 |
| 8,797,037 | B2 * | 8/2014 | Brannon | G01V 3/22 324/353 |
| 8,841,914 | B2 * | 9/2014 | Qu | G01V 3/22 324/353 |
| 9,068,431 | B2 * | 6/2015 | Tosi | E21B 47/00 |
| 9,434,875 | B1 * | 9/2016 | Cannan | C09K 8/805 |
| 10,106,732 | B2 * | 10/2018 | Cannan | C09K 8/805 |
| 2003/0025639 | A1 * | 2/2003 | Rodney | E21B 47/122 343/719 |
| 2005/0017723 | A1 * | 1/2005 | Entov | E21B 43/26 324/346 |
| 2005/0183858 | A1 | 8/2005 | Ayoub et al. | |
| 2005/0222831 | A1 * | 10/2005 | Elfadel | H04B 3/46 703/14 |
| 2005/0274510 | A1 * | 12/2005 | Nguyen | E21B 43/267 166/250.12 |
| 2006/0102345 | A1 * | 5/2006 | McCarthy | G01V 3/30 166/250.1 |
| 2007/0127313 | A1 | 6/2007 | Segall et al. | |
| 2007/0256830 | A1 * | 11/2007 | Entov | G01V 3/26 166/250.1 |
| 2008/0091396 | A1 * | 4/2008 | Kennon | G01V 1/301 703/10 |
| 2009/0166030 | A1 * | 7/2009 | Zhuravlev | G01V 3/265 166/250.1 |
| 2009/0167310 | A1 * | 7/2009 | Smits | G01V 3/265 324/353 |
| 2009/0288820 | A1 * | 11/2009 | Barron | E21B 43/267 166/249 |
| 2010/0066560 | A1 * | 3/2010 | McDaniel | E21B 43/267 340/854.9 |
| 2010/0085132 | A1 * | 4/2010 | Cheng | H01P 3/085 333/245 |
| 2010/0147512 | A1 * | 6/2010 | Cramer | E21B 43/267 166/250.1 |
| 2011/0087473 | A1 * | 4/2011 | Jimenez Chavez | E21B 49/00 703/2 |
| 2011/0102100 | A1 * | 5/2011 | Broyde | H04L 25/0272 333/125 |
| 2011/0121914 | A1 * | 5/2011 | Broyde | H04L 25/0272 333/125 |
| 2012/0181020 | A1 * | 7/2012 | Barron | B82Y 30/00 166/250.1 |
| 2012/0243368 | A1 * | 9/2012 | Geiser | G01V 1/288 367/9 |
| 2013/0211759 | A1 * | 8/2013 | Broyde | G06F 30/367 702/79 |
| 2014/0190686 | A1 * | 7/2014 | Cannan | C23C 14/06 166/250.01 |
| 2015/0103624 | A1 * | 4/2015 | Thompson | G01V 1/20 367/7 |
| 2015/0114623 | A1 * | 4/2015 | Owens | E21B 43/26 166/248 |
| 2015/0253453 | A1 * | 9/2015 | Aldridge | G01V 3/26 702/11 |
| 2016/0069174 | A1 * | 3/2016 | Cannan | E21B 43/267 166/250.1 |
| 2016/0237342 | A1 * | 8/2016 | Cannan | H01B 1/02 |
| 2017/0269137 | A1 * | 9/2017 | Cohen | G06F 17/18 |

OTHER PUBLICATIONS

Sarkar et al. (Fluid Flow Modeling in Fractures, 2004, MIT Earth Resources Laboratory, pp. 1-41) (Year: 2004).*
Carcione et al. ("A Telegrapher Equation for Electric Telemetering in Drill Strings", IEEE, 2002, pp. 1047-1053) (Year: 2002).*
Patzek et al. ("Lossy transmission line model of hydrofractured well dynannics",Journal of Petroleum Science and Engineering 25 2000. 59-77) (Year: 2000).*
Xia et al. ("Attenuation Predictions at Extremely Low Frequencies for Measurement-While-Drilling Electromagnetic Telemetry System", IEEE, 1993, pp. 1222-1228) (Year: 1993).*
Yang, et al., "1D Subsurface Electromagnetic Fields Excited by Energized Steel Casing", Geophysics; Jul.-Aug. 2009; v. 74; No. 4. pp. E159-E180.
Carcione, et al., "A Telegrapher Equation for Electric Telemetering in Drill Strings", IEEE Transactions on Geoscience and Remote Sensing; May 2002; v. 40, No. 5. pp. 1047-1053.

* cited by examiner

SIMULATING CURRENT FLOW THROUGH A WELL CASING AND AN INDUCED FRACTURE

STATEMENT OF GOVERNMENTAL INTEREST

This invention was developed under contract DE-AC04-94AL85000 between Sandia Corporation and the U.S. Department of Energy. The U.S. Government has certain rights in this invention.

CROSS-REFERENCE TO RELATED APPLICATIONS

This application claims benefit of U.S. patent application Ser. No. 13/206,041, "Simulating Current Flow Through a Well Casing and an Induced Fracture," filed Aug. 9, 2011, which is incorporated by reference herein in its entirety.

BACKGROUND

As the population of the world increases, efficient mechanisms for obtaining sources of energy including natural gas and oil are continuously being investigated. One exemplary technique for obtaining access to natural gas and oil reserves is known as hydraulic fracturing, or fracking. Hydraulic fracturing is the process of initiating and subsequently propagating a fracture in a rock formation through utilization of fracturing fluid as a source of energy. To create the fracture in the rock formation, a drill is employed to create a well bore that reaches depths of several thousand feet (until a desired rock formation is reached). A well casing is placed in the well bore, wherein the casing is typically composed of steel or some other conductive metal. The well casing is cemented in place to stabilize the well casing with respect to the earth.

Subsequent to the well casing being cemented in place, a fracturing fluid is pumped down the well bore and through perforations in the well casing at a pressure that is in excess of the fracture gradient of the rock formation. Such pressure causes the rock formation to fracture. Pumping of the fracturing fluid down the well casing is continued to extend the fracture further into the formation. As the fracture extends, a proppant is added to the fracture fluid and pumped down the well casing and into the fracture, thereby causing the fracture to remain open when pumping of the fracture fluid is ceased. This causes the rock formation to become permeable via the fracture, thereby allowing natural gas or oil to be extracted from the rock formation. Hydraulic fractures can be induced using both vertical and horizontal wells.

While hydraulic fracturing techniques have improved over time, there are still several imperfections associated with such techniques. For example, when a fracture is induced and extended in a rock formation, the fracture will travel along the minimum stress directions in the formation. Based upon geological studies, such minimum stress directions can be estimated prior to inducing the fracture in the rock formation. These estimates, however, may be imprecise. In other words, an operator of the well may believe that the fracture is at a particular location and of a certain size and orientation (e.g., horizontal, vertical, combination). In actuality, however, the fracture may be further from the well bore than desired and may travel in an unexpected direction. Additionally, once the fracture is created, it is difficult to ascertain performance of the well. Typically, an operator will monitor amounts of natural gas or oil extracted from the well and determine the quality of the well based upon a rate of flow of natural gas or oil from the well. The operator is unable to obtain, however, data that is indicative of potential of an amount of natural gas or oil that can be extracted from a rock formation. For example, the operator is unable to ascertain how much natural gas may be extracted from the well if the fracture had extended somewhat further and/or traveled in a different direction.

SUMMARY

The following is a brief summary of subject matter that is described in greater detail herein. This summary is not intended to be limiting as to the scope of the claims.

Described herein are various technologies pertaining to modeling a well that is configured to extract natural gas from a rock formation that has an induced fracture therein. Pursuant to an example, a data store may retain a computer-implemented model of a well system that is configured to extract natural gas or oil from a rock formation beneath the surface of the earth. The computer-implemented model includes a representation of a well casing as a transmission line that leaks electric current when such transmission line is electrically energized. Additionally, the computer implemented model of the well may include a representation of the fracture as a conductive transmission line that leaks electric current as electric current traverses such transmission line. The fracture can be modeled as a transmission line, as fluid-filled propped fractures are more conducting than the surrounding formation due to the increased porosity. In addition, proppants can be made of conductive materials.

The computer-implemented model discussed above can be employed in connection with computing an expected electromagnetic field at the surface of the earth based upon a variety of parameters, including hypothesized location (direction), length, and orientation of the fracture, as well as conductivity of the earth at varying depths. The expected electromagnetic field may then be compared with data acquired in the field that is indicative of the electromagnetic field at the surface of the earth, and an estimate of the actual location, length, and orientation of the fracture can be computed based upon such comparison. In another exemplary embodiment, the computer implemented model can be employed in connection with directly generating an estimate of location, length, and orientation of a fracture in a rock formation beneath the surface of the earth based at least in part upon data received from sensors that is indicative of an electromagnetic field at the surface of the earth above the fracture.

In an example, a well casing in a well bore that is used to extract natural gas or oil from a rock formation may be energized with electric current, wherein at least some of such current is conducted through the proppant of the hydraulic fracture. As electric current traverses the well casing and the fracture (via the porosity maintained by the proppant), a portion of such current may leak from the well casing and the fracture through the earth (to a ground). The electric current in the well casing and/or fracture and the electric current that leaks from the well casing and/or the fracture may cause electromagnetic fields to be generated that can be sensed at the surface of the earth above the fracture in the rock formation. The location and strength of the electromagnetic field on the surface of the earth that is induced by the electric current in the well casing and/or fracture and electric current that leaks through the earth can be indicative of the direction, location, and orientation of the fracture.

The aforementioned computer-implemented model may take into consideration the fact that the well casing and the fracture leak current as current traverses such well casing and proppant. Therefore, in the computer-implemented model, the well casing and the fracture can be represented as transmission lines that leak electric current as the current traverses such transmission line. With more particularity, the well casing and the fracture can be represented as a plurality of two-port elementary circuits, wherein each of such circuits represents an infinitesimally short segment of the transmission line. The material of the well casing, the type of proppant, the conductivity of certain layers of earth surrounding the well casing and proppant, amongst other factors, may be considered in connection with modeling the well casing and the fracture as transmission lines that leak electric current.

Accordingly, in an exemplary approach, the computer implemented model of the well casing may be employed to compute an expected electromagnetic field at the surface of the earth given a proposed location of the fracture, a proposed location of a source of electric current (on the well casing), a proposed amount of electric current provided to the well casing, and at least one proposed ground. Simulations can be undertaken for a plurality of different proposed fracture locations, lengths, orientations, etc., thereby producing a plurality of different corresponding expected electromagnetic fields at the surface of the earth. In the field, sensors can be employed to generate values that are indicative of the electromagnetic field at the surface of the earth, and such values can be compared with the expected electromagnetic field computing during simulation. The size, direction, location, etc. of the fracture may then be estimated based at least in part upon the values obtained in the field.

Other aspects will be appreciated upon reading and understanding the attached figures and description.

DETAILED DESCRIPTION

Figure 1:
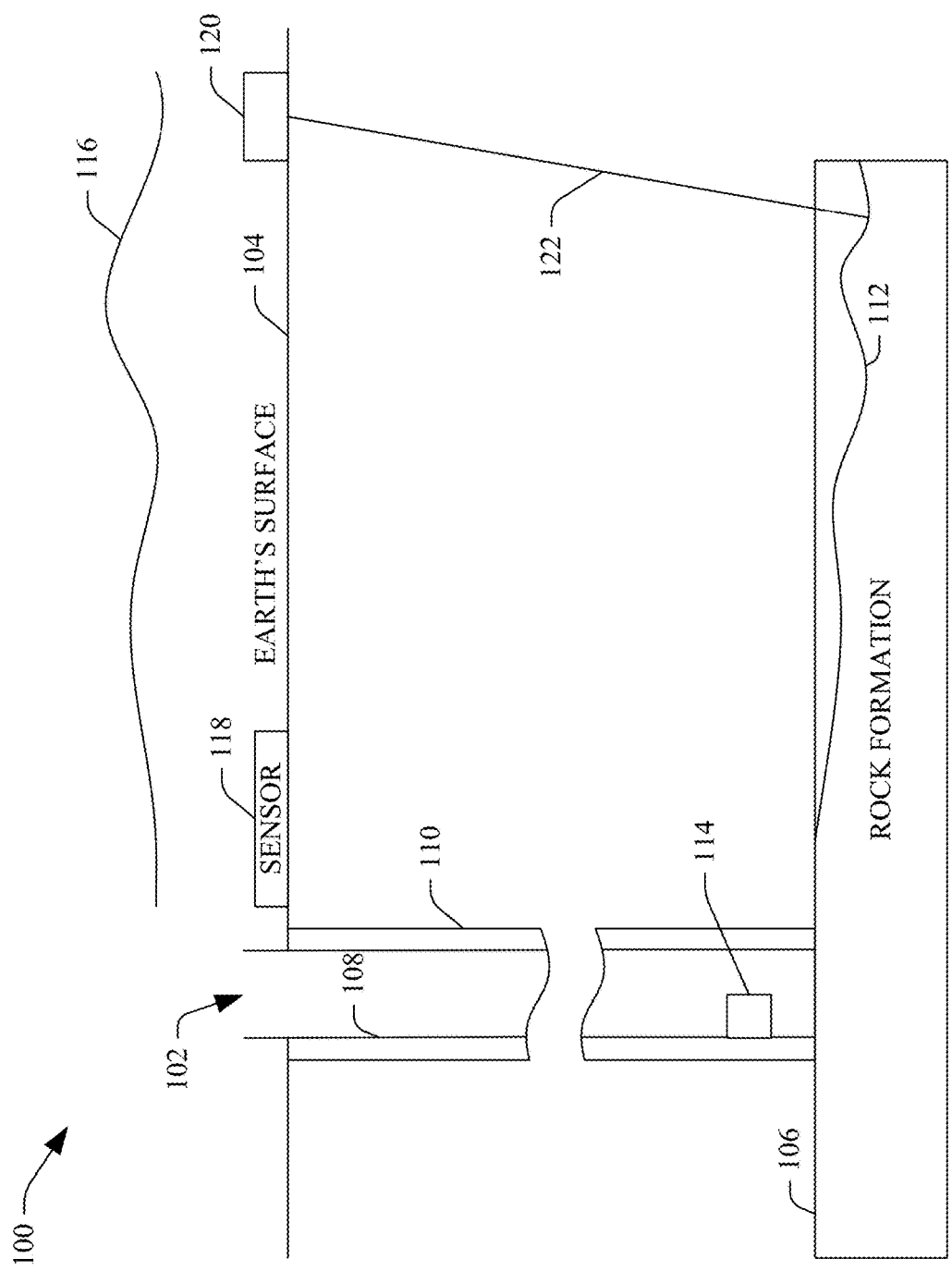
FIG. 1 is an exemplary diagram of a well system that is configured to extract natural gas or oil from a rock formation beneath the surface of the earth.

Various technologies pertaining to modeling a well casing and/or fracture in a rock formation as a transmission line that leaks electric current as electric current traverses such transmission line will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary well system 100 that is configured to extract natural gas or oil by way of an induced fracture in a rock formation is illustrated. The system 100 includes a well bore 102, which extends from the surface of the earth 104 to a rock formation 106 that retains oil or natural gas. While the well bore 102 is shown as being vertical in nature, it is to be understood that the well bore 102 may be vertical, horizontal, or diagonal. In an exemplary embodiment, the rock formation 106 may be several thousand feet below the surface of the earth 104, and may be shale. A well casing 108 is positioned in the well bore 102 and extends from the surface of the earth 104 to the rock formation 106. The well casing 108 can be installed in the well bore 102 through utilization of any suitable method. Typically, the well casing 108 is composed of a conductive material such as steel or other suitable metal. A cement stabilizer 110 is formed to stabilize the well casing 106 in the well bore 102 with respect to the earth. This can cause the casing 106 to remain stable as fracture fluid and/or a proppant is transferred to the rock formation 106, possibly under high pressure. The cement stabilizer 110 can also be configured to cause the well casing 108 to remain stable as natural gas or oil is extracted from the rock formation 106 by way of the well bore 102.

Through utilization of a fracturing fluid under high pressure, a fracture 112 is induced in the rock formation 106. A proppant is also directed down the well bore 102 to fill the fracture 112, thereby causing the fracture 112 to remain open (and thus causing the rock formation 106 to be permeable). This allows natural gas or oil to be extracted from the rock formation 106.

A source of electricity 114 can be positioned near the bottom of the well bore 102 on the casing 108 proximate to the rock formation 106, wherein the source of electricity 114 is configured to generate one or more pulses of electric current. Accordingly, the well casing 108 is electrically energized and acts as a source of electric current. The proppant in the fracture 112 of the rock formation 106 is typically a material such as sand, ceramic, or the like that makes the fracture more conducting than the rock formation 106 (host medium) due to the increased porosity. The proppant material can be made conductive to further enhance the conductivity of the fracture. Therefore, at least some of the electric current generated by the source of electricity 114 travels from the well casing 106 through the proppant of the induced fracture 112 of the rock formation 106. At least a portion of the electric current that is generated by the source of electricity 114 leaks from the well casing 108 and the proppant of the fracture 112 in the rock formation 106 as electric current traverses the well casing 108 and the proppant. This can induce an electromagnetic field 116 at the surface of the earth 104.

A sensor 118 can be positioned proximate to the surface of the earth 104 to output data at at least one location that is indicative of the electromagnetic field 114 caused by the electric current in the well casing 108 and leaking from the well casing 108 and/or in the induced fracture 112 or leaking from the induced fracture 112 in the rock formation 106. The optimal locations of sensors (such as the sensor 118) can be determined through numerical modeling. Data output by the sensor 118 can be indicative of the size of the fracture 112 in the rock formation 106, the orientation of the fracture 112 in the rock formation 106 (e.g., traveling horizontally, vertically, diagonally, etc.), the length and depth of the fracture 112 in the rock formation 106, etc. A grounding point 120 can be positioned on the surface of the earth 104, coupled to the fracture 112 by way of a conductive medium 122, which may be the earth, a wire, etc., thereby completing the electric circuit. Alternatively, the grounding point 120 can be located beneath the surface of the earth 104 at another well (not used in the fracturing process) that is relatively distant from the well system 100. In an example, numerical simulation can be employed to determine an appropriate location for the grounding point 120. It can therefore be ascertained that by electrically energizing the well casing 108 to cause the well casing 108 to act as a source of electricity, an electro-magnetic field can be induced at the surface of the earth 104 that can be indicative of the size, orientation, length, position, etc. of the induced fracture 112 in the rock formation 106. As used herein, the term "size" can refer to width of portions of the fracture 112, the term "orientation" can refer to orientation of at least a portion of the fracture 112 relative to the surface of the earth 104 (e.g., parallel to the surface of the earth 104, perpendicular to the surface of the earth 104, . . . ), and the terms "position" and "location" can refer to position of the fracture 112 relative to the well bore 102 and/or the surface of the earth 104 at differing points along the fracture 112.

Figure 2:
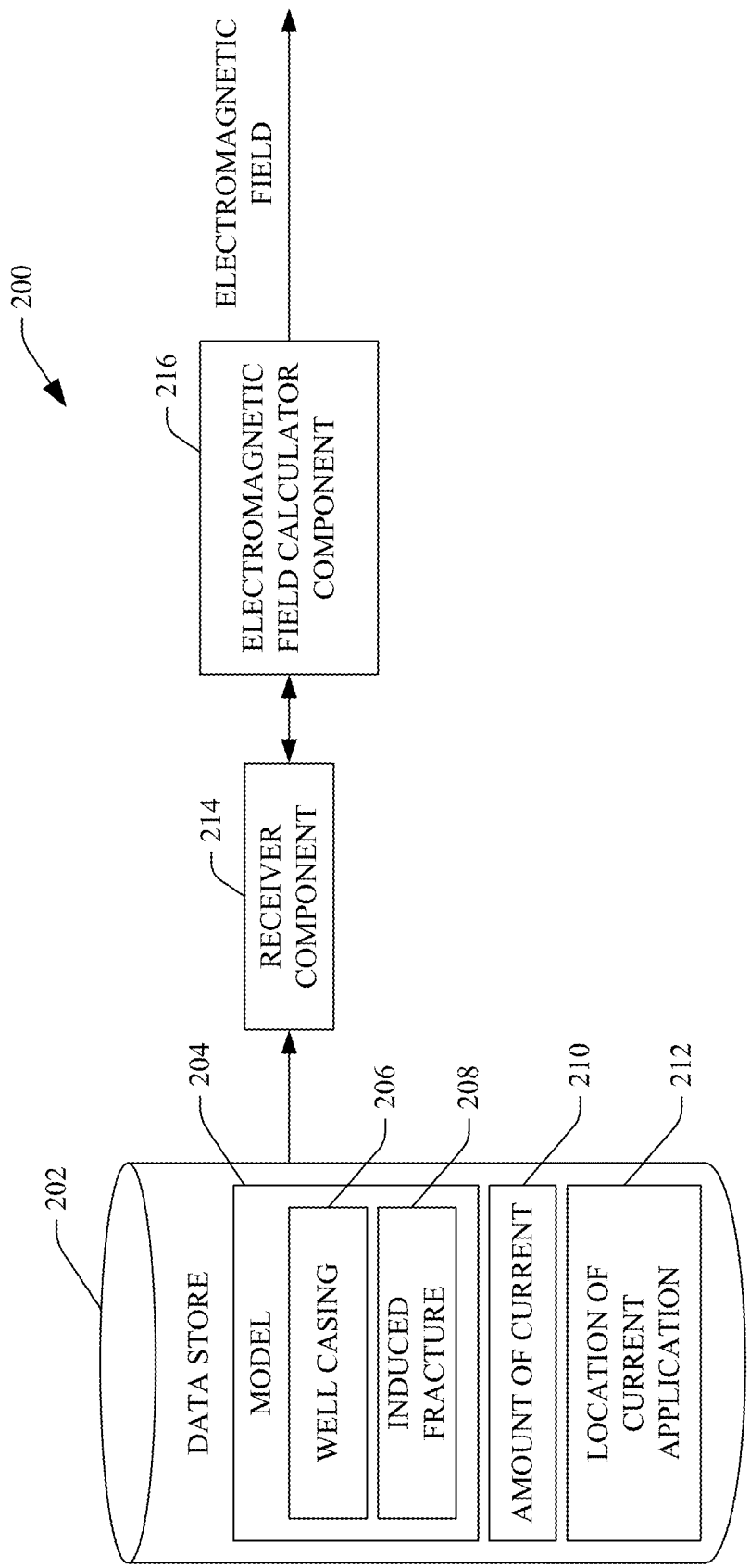
FIG. 2 is a functional block diagram of an exemplary computer-implemented system that facilitates computing, by way of simulation, an electromagnetic field caused by electric current leaking from an electrically energized well casing and a conductive proppant.

With reference now to FIG. 2, an exemplary system 200 that facilitates estimating an electromagnetic field at the surface of the earth based at least in part upon a model of a well system is illustrated. The system 200 comprises a data store 202, which may be a memory, a hard drive, or other suitable data repository that is accessible to a processor. The data store 202 comprises a computer-implemented model 204 of a well system such as the well system 100 discussed above. The model 204 includes a model of a well casing 206 as well as a model of a (hypothetical) induced fracture 208. Pursuant to an example, and as will be described in greater detail below, the model of the well casing 206 may represent the well casing as a transmission line that leaks electric current as electric current traverses such transmission line. Similarly, the model of the induced fracture 208 may represent the induced fracture as a transmission line that leaks electric current as electric current traverses such transmission line.

The data store 202 further comprises a value that is indicative of an amount of current 210 that is to be applied to the well casing as well as a value that is indicative of the location 212 that the electric current is applied on the well casing 212.

The system 200 includes a receiver component 214 that receives, from the data store 202, the computer-implemented model 204, the value that is indicative of the amount of current 210, and the value that is indicative of the location 212 on the well casing where the current is applied. An electromagnetic field calculator component 216 can be in communication with receiver component 214 and can calculate an expected electromagnetic magnetic field at the surface of the earth based at least in part upon the computer-implemented model 204 of the hydraulic fracturing system, the value that is indicative of the amount of electric current 210 applied to the well casing, and the value that is indicative of the location 212 on the well casing where the electric current is applied. For example, the electromagnetic field calculator component 216 may be the entirety of or a portion of a three-dimensional finite difference code that is configured to compute electromagnetic fields.

The computer-implemented model 204 of the hydraulic fracturing system can take into consideration the conductivity of layers of the earth that surround the well casing as well as conductivity of earth that surrounds the induced fracture. In an example, these parameters may be considered when generating the model of the well casing and the model of the induced fracture 206 and 208, respectively. Pursuant to an example, the greater the conductivity of a layer of earth surrounding a well casing, the more electric current that will leak from such well casing and travel through the earth (to a ground point). Such conductivity of the earth can be ascertained through analysis of water or well logs, electric logs, etc., which indicate earth resistivity as a function of depth. The model of the induced fracture 208 can also take into consideration parameters of the earth that are believed or known to be proximate to the rock formation in which the fracture is induced. This can result in a relatively accurate estimation of the electromagnetic field at the surface of the earth, given the model of the (hypothetical) fracture 208 and other parameters in the data store 202.

Subsequently, an operator of a well system (that corresponds to the well system modeled in the computer-implemented model 204) may analyze the electromagnetic field values to ascertain whether the estimated electromagnetic field is strong enough to be observed via sensors at the surface of the earth. If the operator of the well system determines that the electromagnetic field for one or more hypothetical induced fractures is observable, then the operator may employ a source of electricity at a location on the well casing that corresponds to the location 212 in the data store 202 to generate electric current (in an amount corresponding to the amount of current 210 in the data store). The operator may then utilize a sensor to output data that is indicative of the electromagnetic field at the surface of the earth and compare such data with data output by the electromagnetic field calculator component 216 for one or more modeled fractures. The operator may then be able to determine how well the electromagnetic fields sensed at the surface of the earth corresponds to an estimated electromagnetic field for a particular modeled fracture, and thus can ascertain an approximate location, orientation, length, etc. of the actual hydraulic fracture in the rock formation.

The system 200 may be implemented in a variety of different types of computing devices. For instance, the system 200 may be implemented in a conventional desktop computing system. In another example, the system 200 may be implemented in a mobile computing device such as a portable telephone, a tablet computing device, or the like. In any event, it can be ascertained that the electromagnetic field computed by the system 200 may be undertaken off site and prior to the operator obtaining measurements at the surface of the earth on site.

Figure 3:
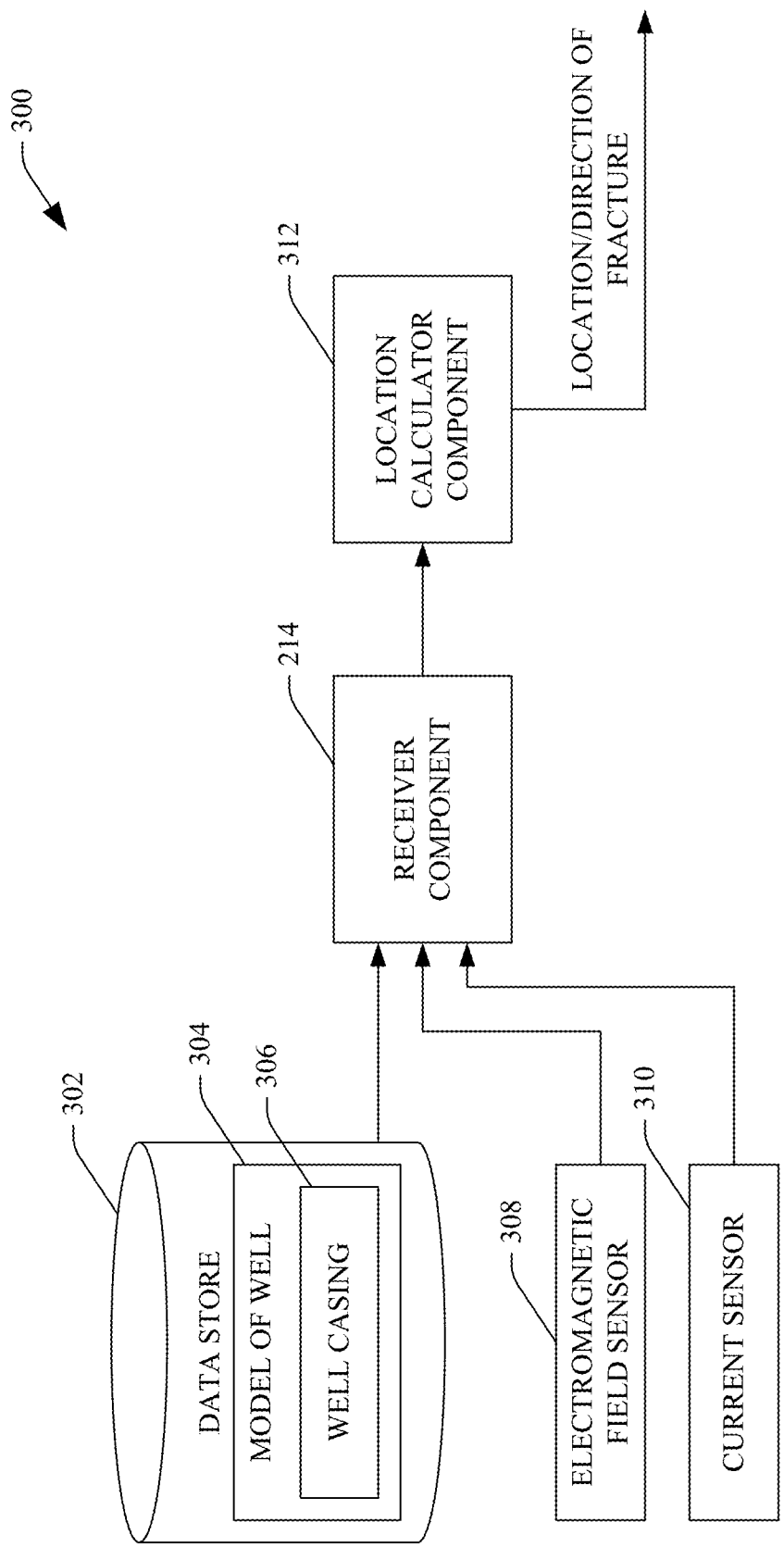
FIG. 3 is a functional block diagram of an exemplary system that facilitates computing a location of a fracture and a rock formation beneath the surface of the earth.

Now referring to FIG. 3, an exemplary system 300 that facilitates computing an estimated location, length, and/or orientation of an induced fracture in a rock formation beneath the surface of the earth is illustrated. The system 300 comprises a data store 302 that includes a computer-implemented model 304 of at least a portion of a well system that is configured to extract natural gas or oil from a rock formation beneath the surface of the earth. With more particularity, the model 304 includes a model of a well casing 306, wherein such model of the well casing 306 represents the well casing utilized at a particular well site as a transmission line that leaks electric current.

The system 300 further comprises an electromagnetic field sensor 308 that can be placed proximate to the surface of the earth and can output data that is indicative of an electromagnetic field at the surface of the earth. It can be noted that there may be several sensors 308 at various locations that are configured to capture data indicative of an electromagnetic field induced by an electrically energized fracture and/or well casing. A current sensor 310 can be configured to monitor an amount of electric current that is provided at a particular position on the well casing.

The receiver component 214 receives the model 304, data from the electromagnetic field sensor 308, and data from the current sensor 310. A location calculator component 312 computes a size, location, length, and/or orientation of an induced fracture beneath the surface of the earth based at least in part upon the computer-implemented model 304, data from the electromagnetic field sensor 308, and data from the current sensor 310. Again, the location calculator component 312 may be or include a three-dimensional finite difference algorithm that is configured to compute the location, length, and/or orientation of an induced fracture based at least in part upon sensed values that indicate the existence of an electromagnetic field at the surface of the earth. The location calculator component 312 can consider other parameters pertaining to well system when computing the size, location, length, and/or orientation of an induced fracture in a rock formation beneath the surface of the earth, including but not limited to conductivity/resistivity of different layers of earth that surround the well casing and/or the rock formation amongst other data that may affect current leakage (such as temperature, humidity or the like).

The exemplary system 300 may be implemented in a device that can be used in the field by an operator of the well system to determine an estimated size, location, direction and/or orientation of an induced fracture. Thus, the system 300 may be included in a laptop, a mobile telephone, a tablet computing device, or the like. In an alternative embodiment, the system 300 may be a server or may be implemented in a server that is accessible by way of a network connection, and the data output by the sensors 308 and 310 can be provided to the server by way of such connection. The location calculator component 312 can compute the estimated size, location, orientation, length, and/or orientation of the induced fracture in the rock formation, and can transmit such estimated size, location, length, and/or orientation to a computing device that is used by the operator.

Figure 4:
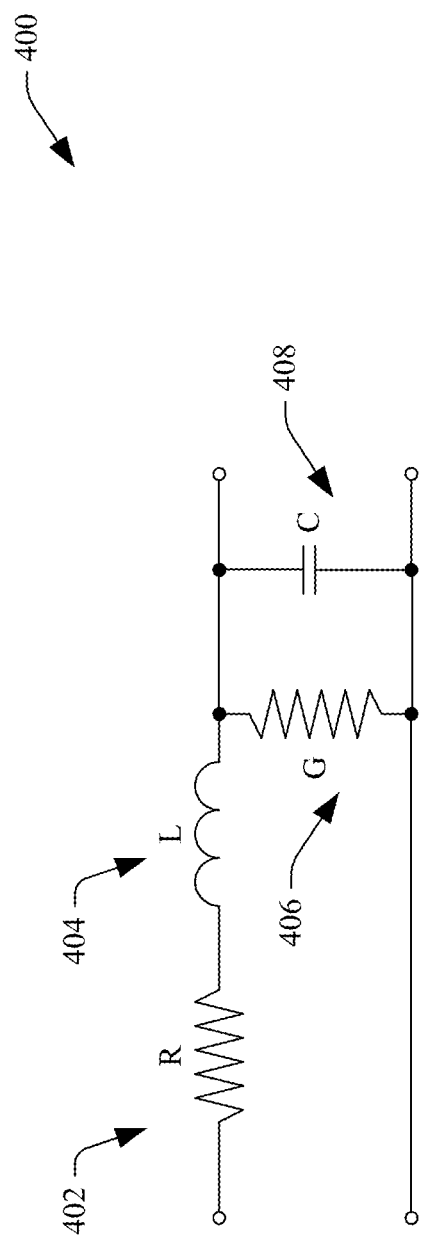
FIG. 4 is an exemplary circuit schematic of a two-port circuit that can be utilized in connection with modeling a well casing and/or hydraulic fracture as a transmission line that leaks electric current.

Turning now to FIG. 4, a circuit diagram of an exemplary two-port circuit 400 that can be utilized in connection with representing a well casing and/or induced fracture in a rock formation as a transmission line that leaks electric current as electric current traverses the transmission line is illustrated. For example, the well casing and/or the induced fracture can be represented as a relatively large number of two-port circuits connected in series, wherein each two-port circuit represents an infinitesimally short segment of a transmission line. Therefore, an electrically energized well casing and an associated fracture can be represented as a transmission line, where the casing and the fracture are represented as one conductor and the earth is represented as another conductor. The two-port circuit 400 includes a resistor 402 with resistance R in series with an inductor 404 with inductance L. The two-port circuit 400 further comprises a resistor 406 with a shunt conductance G, and a capacitor 408 with a shunt capacitance C. The resistor 406 and the capacitor 408 are in parallel with one another, and the parallel combination of the resistor 406 and the capacitor 408 are in series with the resistor 402 and the inductor 404.

The distributed parameters R, L, C and G are in appropriate units per unit length. Accordingly, the well casing and the fracture (and earth system) can be modeled using a series of infinitesimal two-port circuits (such as the circuit 400). The well-known telegrapher's equations:

$$\frac{\partial V(z, t)}{\partial z} = -R(z)I(z, t) - L(z)\frac{\partial I(z, t)}{\partial t}, \quad (1)$$

$$\frac{\partial I(z, t)}{\partial z} = -G(z)V(z, t) - C(z)\frac{\partial V(z, t)}{\partial t} \quad (2)$$

can be used to describe electric current flow in the well casing/fracture system. Eq. (1) describes the decrease in the transverse voltage (V) due to the impedance dictated by R and L at a position along the well casing/fracture system denoted by z over time t. Eq. (2) describes the decrease of current I due to current leakage between the well casing and/or fracture and the earth dictated by G and C. In general, the parameters of L, R, C, and G may be a function of the distance z along the transmission line. Eqs. (1) and (2) can be finite differenced and included as an electrical current source term in a finite difference electromagnetic code. Well casings and proppant filled fractures that are vertical, horizontal, or a combination thereof can be represented by the above equations. The parameters R, L, G and C can be determined empirically for a particular well casing and fracture scenario.

Figure 5:
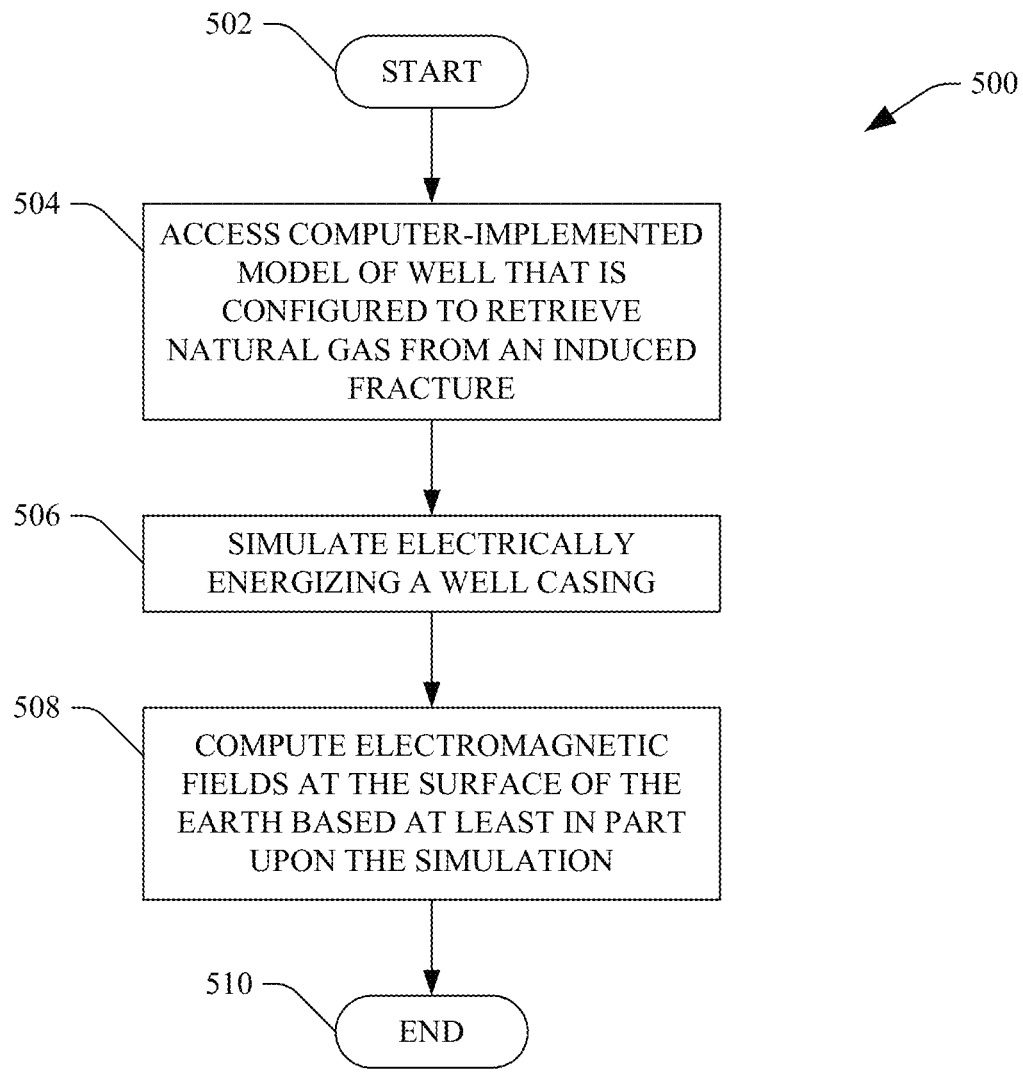
FIG. 5 is a flow diagram that illustrates an exemplary methodology for computing electromagnetic fields at the surface of the earth based at least in part upon a simulated electric pulse being transmitted through a conductive proppant in a fracture in a rock formation.
Figure 6:
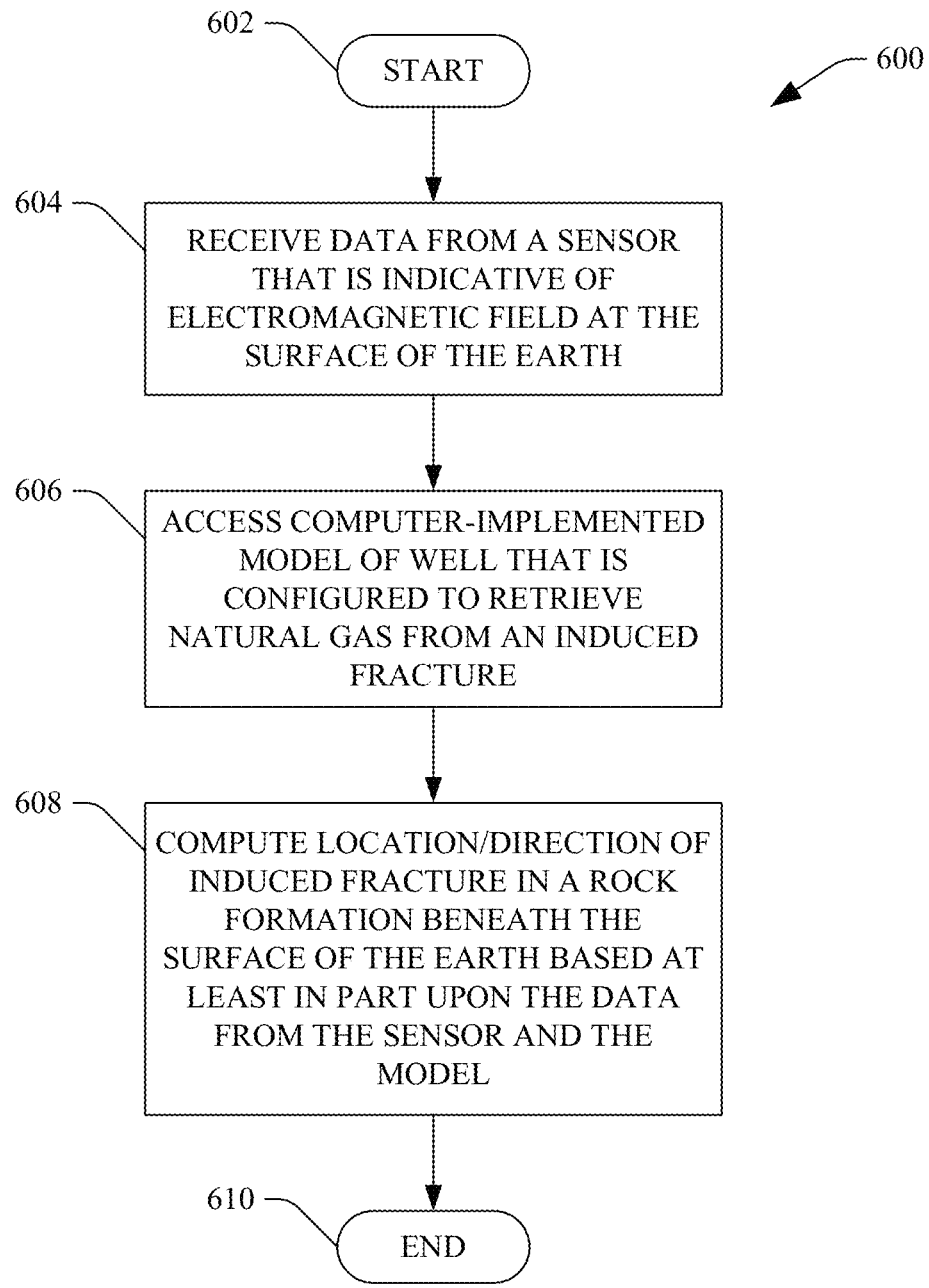
FIG. 6 is a flow diagram that illustrates an exemplary methodology for computing a location, length, and/or orientation of an induced fracture in a rock formation beneath the surface of the earth.

With reference now to FIGS. 5-6, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Turning now to FIG. 5, an exemplary methodology 500 that facilitates computing electromagnetic fields at the surface of the earth through utilization of simulation is illustrated. The methodology 500 starts at 502, and at 504 a computer-implemented model of a well system that is configured to retrieve natural gas from an induced fracture in a rock formation beneath the surface of the earth is accessed. The computer-implemented model of the hydraulic fracture system includes a representation of a well casing and/or a hydraulic fracture as an energized transmission line that leaks electric current. For instance, the well casing and/or the hydraulic fracture can be represented through utilization of a series of the two-port circuits such as the two-port circuit 400 shown and described with respect to FIG. 4.

At 506, application of a certain amount of electric current to a particular portion of the well casing modeled in the computer-implemented model of the well system is simulated. At 508, a value that is indicative of an electromagnetic field at the surface of the earth is computed via simulation based at least in part upon the computer implemented model of the well system. The methodology 500 completes at 510.

Turning now to FIG. 6, another exemplary methodology 600 that facilitates computing a size, location, length, and/or orientation of an induced fracture in a rock formation beneath the surface of the earth is illustrated. The methodology 600 starts at 602, and at 604 data from a sensor that is indicative of an electromagnetic field at the surface of the earth is received. For instance, an operator of a well system that is configured to extract natural gas or oil from a rock formation beneath the surface of the earth can utilize a sensor to sense the electromagnetic field proximate to the well system.

At 606, a computer implemented model of the well system that is configured to retrieve natural gas from an induced fracture is accessed. This model can include a model of a well casing as a leaky transmission line, as well as a representation of a fracture as a leaky transmission line, wherein the earth is a conductor.

At 608, a size, location, direction, and/or orientation of the induced fracture in the rock formation beneath the surface of the earth is computed based at least in part upon the data from the sensor and the computer implemented model. The methodology 608 completes at 610.

Figure 7:
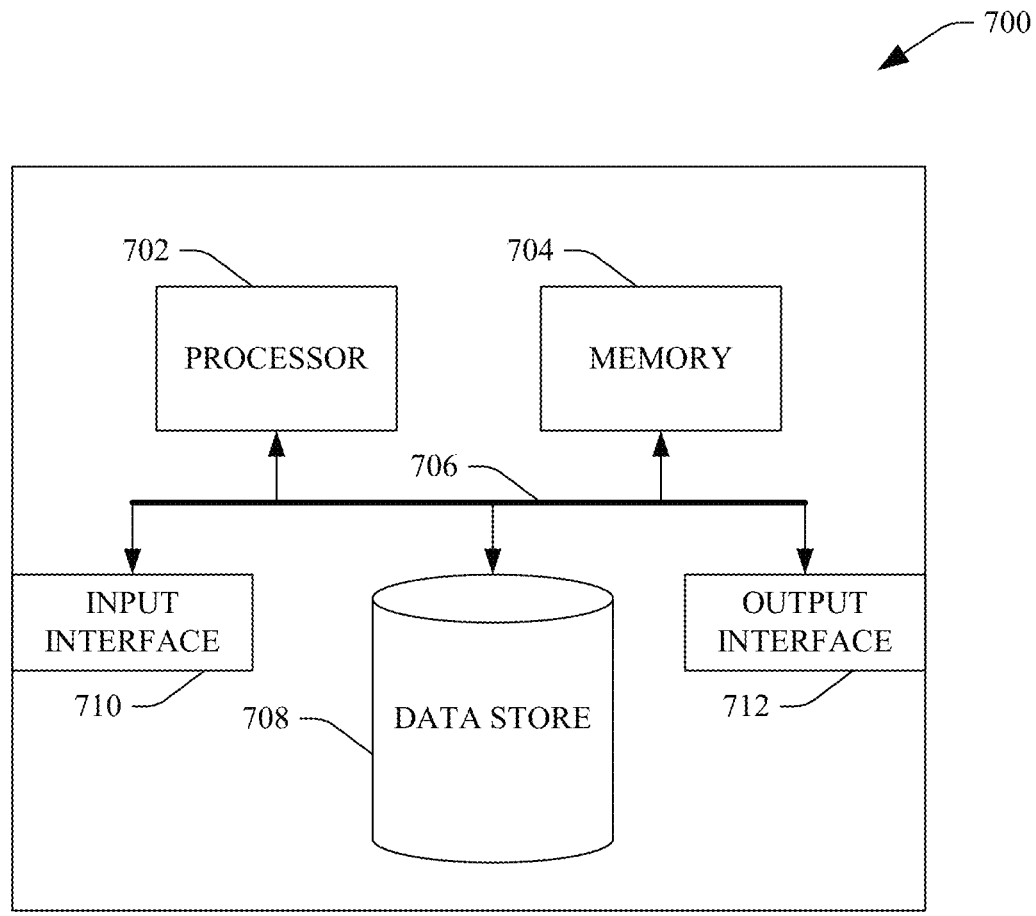
FIG. 7 is an exemplary computing system.

Now referring to FIG. 7, a high-level illustration of an exemplary computing device 700 that can be used in accordance with the systems and methodologies disclosed herein is illustrated. For instance, the computing device 700 may be used in a system that supports computing estimates of electromagnetic fields induced by an energized well casing and fracture in a well system. In another example, at least a portion of the computing device 700 may be used in a system that supports estimating a size, location, length, and/or orientation of an induced fracture in a rock formation beneath the surface of the earth. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store computer-implemented models of well casing(s) and/or fracture(s), values indicative of an amount of electric current applied to a well casing, values indicative of a location on a well casing where electric current is applied, etc.

The computing device 700 additionally includes a data store 708 that is accessible by the processor 702 by way of the system bus 706. The data store 708 may be or include any suitable computer-readable storage, including a hard disk, memory, etc. The data store 708 may include executable instructions, computer-implemented models, etc. The computing device 700 also includes an input interface 710 that allows external devices to communicate with the computing device 700. For instance, the input interface 710 may be used to receive instructions from an external computer device, a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A system, comprising:
 a well casing disposed within the earth;
 a fracturing fluid comprising a proppant further disposed within the earth;
 a source of electricity in electrical connectivity with the well casing that when energized causes an electrically energized well casing and proppant;
 a sensor for detecting electromagnetic fields created by electricity from the source of electricity, well casing and proppant;
 a receiver component that receives:
 a computer-implemented model of a well system comprising the well casing, the computer-implemented model comprising a representation of the electrically energized well casing as a transmission line that leaks electric current as electric current traverses the well casing;
 a value that indicates an amount of electric current that is applied to the well casing; and
 a location of the source of the electricity;
 a representation of an electrically conducting proppant-filled induced fracture as a transmission line that leaks electric current as the electric current traverses the proppant-filled induced fracture; and
 an electromagnetic field calculator component in communication with the receiver component that calculates an estimated electromagnetic field at least one location on a surface of the earth based on parameters that comprise the conductivity of a layer of earth surrounding the well casing;
 wherein the receiver component receives data from the sensor indicative of the electromagnetic field at the surface of the earth, and wherein the electromagnetic field calculator component performs a comparison between the data from the sensor with the estimated electromagnetic field calculated by the electromagnetic field calculator component and outputs one or more characteristics of an induced fracture relative to the well casing based at least in part upon the comparison; and wherein the representations of the electrically energized well casing and proppant comprises a plurality of two-port circuits coupled in series; and wherein the one or more characteristics are selected from the group consisting of location, size, orientation, and length of the induced fracture; and wherein the receiver component receives a hypothetical location of an induced fracture, and wherein the electromagnetic field calculator component calculates the estimated electromagnetic field based at least in part upon the hypothetical location of the induced fracture.

2. The system of claim 1, wherein the source of electricity is proximate to the rock formation.

3. The system of claim 1, wherein the source of electricity pulses current to energize the well casing.

4. The system of claim 1, wherein each two-port circuit in the plurality of two-port circuits comprises a first resistor in series with an inductor.

5. The system of claim 4, wherein each two-port circuit in the plurality of two-port circuits comprise a second resistor in parallel with a capacitor.

6. The system of claim 5, wherein the first resistor and the inductor are in series with a parallel combination of the second resistor and the capacitor.

7. The system of claim 6, wherein values of resistance R of the first resistor, inductance L of the inductor, shunt capacitance C of the capacitor, and shunt conductance G in a two-port circuit amongst the plurality of two-port circuits are defined based at least in part upon distance z along the transmission line from the source of the electric current.

8. The system of claim 7, wherein electric current flow in the well casing is modeled through utilization of the following algorithm:

$$\frac{\partial V(z, t)}{\partial z} = -R(z)I(z, t) - L(z)\frac{\partial I(z, t)}{\partial t},$$

where V is a transverse voltage, I is electric current, and t is time.

9. The system of claim 8, wherein electric current flow in the well casing is modeled through utilization of the following algorithm:

$$\frac{\partial I(z, t)}{\partial z} = -G(z)V(z, t) - C(z)\frac{\partial V(z, t)}{\partial t}.$$

10. A method for determining a location of a fracture in a rock formation comprising:
 calculating an estimated electromagnetic field based at least in part on a hypothetical location of an induced fracture determined by a computer executing a model of a well system based on the rock formation;
 placing sensors above the rock formation as determined by the computer executing the model;
 electrically energizing a well casing and a fluid comprising a proppant in the fracture with an amount of electric current;
 outputting data that is indicative of an electromagnetic field caused by electric current in the well casing and proppant;
 acquiring data from a sensor that is indicative of an electromagnetic field at a location;
 causing a processor to access a computer-implemented model of a well system comprising the well casing, the computer-implemented model of the well system comprising a representation of the well casing and proppant as an energized transmission line that leaks electric current; and
 computing one or more characteristics of the fracture in the rock formation based at least in part upon the particular amount of electric current used to electrically energize the well casing and proppant in the fracture and the data acquired from the sensor; and
 wherein the representations of the electrically energized well casing and proppant comprises a plurality of two-port circuits coupled in series; and
 wherein computing the one or more characteristics of the fracture in the rock formation also comprises performing a comparison between the data from the sensor with the estimated electromagnetic field and outputting the one or more characteristics of the fracture relative to the comparison; and
 wherein the one or more characteristics are selected from the group consisting of location, size, orientation and length of the fracture.

11. The method of claim 10, wherein the electric current is pulsed.

12. A non-transitory computer-readable medium for determining a fracture location in a rock formation, comprising instructions that, when executed by a processor, cause the processor to perform acts comprising:
 receiving a computer-implemented model of a well system that is configured to extract natural gas from a rock formation beneath the surface of the earth, the computer implemented model comprising:
 a representation of an electrically energized well casing as a transmission line that leaks electric current;
 a representation of a hypothetical fracture in the rock formation as the transmission line that leaks electric current;
 an amount of electric current utilized to energize the well casing; and
 a location on the well casing where the electric current is initially applied to energize the well casing;
 computing an expected electromagnetic field at the surface of the earth caused by the electric current traversing the well casing and the hypothetical fracture leaking from the well casing and the hypothetical fracture based at least in part upon the computer implemented model;
 computing sensor locations that are optimized to receive the expected electromagnetic field;
 receiving sensor data indicative of an electromagnetic field caused by an electric current in an electrically energized well casing and proppant in a fracture;
 calculating an electromagnetic field from the received sensor data;
 comparing the computed and expected electromagnetic fields to determine one or more characteristics of the fracture in the rock formation; and
 wherein the one or more characteristics are selected from the group consisting of location, size, orientation and length of the fracture.

13. The computer-readable medium of claim 12, wherein the representation of the well casing and the representation of the hypothetical fracture comprise a plurality of two-port circuits coupled in series.

* * * * *